US006675264B2

(12) United States Patent
Chen et al.

(10) Patent No.: US 6,675,264 B2
(45) Date of Patent: Jan. 6, 2004

(54) METHOD AND APPARATUS FOR IMPROVING WRITE PERFORMANCE IN A CLUSTER-BASED FILE SYSTEM

(75) Inventors: Ying Chen, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/851,014

(22) Filed: May 7, 2001

(65) Prior Publication Data

US 2002/0166031 A1 Nov. 7, 2002

(51) Int. Cl.$^7$ .............................................. G06F 12/00
(52) U.S. Cl. ...................... 711/141; 711/130; 711/162; 714/4; 714/7; 714/31
(58) Field of Search ................................ 711/141, 130, 711/162; 714/4, 7, 31

(56) References Cited

U.S. PATENT DOCUMENTS

| | | | | |
|---|---|---|---|---|
| 5,636,355 A | * | 6/1997 | Ramakrishnan et al. | 711/113 |
| 5,826,002 A | * | 10/1998 | Yamamoto et al. | 714/6 |
| 5,884,046 A | * | 3/1999 | Antonov | 709/238 |
| 5,893,149 A | | 4/1999 | Hagersten et al. | 711/135 |
| 5,903,907 A | * | 5/1999 | Hagersten et al. | 711/122 |
| 6,151,684 A | * | 11/2000 | Alexander et al. | 714/4 |
| 6,151,688 A | * | 11/2000 | Wipfel et al. | 714/48 |
| 6,154,816 A | * | 11/2000 | Steely et al. | 711/150 |
| 6,167,490 A | * | 12/2000 | Levy et al. | 711/148 |
| 6,360,231 B1 | * | 3/2002 | Pong et al. | 707/201 |
| 6,449,641 B1 | * | 9/2002 | Moiin et al. | 709/220 |

OTHER PUBLICATIONS

John Hennessy et al., Manual, "Computer Architecture: A Quantitative Approach", Morgan Kaufman Publishers, Inc., (1990), Chapter 8, pp. 466–487.

E. Omiecniski et al., "Performance Analysis of a Concurrent File Reorganization Algorithm for Record Clustering," 1994, IEEE Transactions on Knowledge and Data Engineering, 6(2):248–257.

E. Omiecinski et al., "Concurrent File Reorganization for Record Clustering A Performance Study," 1992, IEEE, pp. 265–272.

F.E. Bassow, IBM AIX Parallel I/O System: Installation, Administration, and Use. IBM Kingstom, May 1995. Document No. SH34–6065–00.

R. Bennett et al., "Jovian: A Framework for Optimizing Parallel I/O," 1994, In Proc. of the Scalable Parallel Libraries Conf., IEEE Computer Society Press, pp. 10–20.

P.F. Corbett et al., "The Vesta Parallel File System," 1996, ACM Transactions on Computer Systems, 14(3):225–264.

J. Huber et al., "PPFS: A High Performance Portable Parallel File System," 1995, In Proc. of the $9^{th}$ ACM Int'l Conf. on Supercomputing, ACM Press, pp. 385–394.

(List continued on next page.)

*Primary Examiner*—Donald Sparks
*Assistant Examiner*—Ngoc V. Dinh
(74) *Attorney, Agent, or Firm*—Gates & Cooper LLP

(57) ABSTRACT

A method of writing to cache in a clustered environment. A first node in a storage cluster receives a request to write data from a user application. The first node determines if the data is owned by a remote node. If the data is owned by a remote node, the data in the remote node may be invalidated, if necessary. Such invalidation may not be necessary if a global cache directory is utilized. Thereafter, the data is written in a cache of the first node. Additionally, the data is written in a cache of a partner node of the first node. Confirmation of the cache write in the partner node is then received in the first node.

48 Claims, 6 Drawing Sheets

OTHER PUBLICATIONS

D. Kotz et al., "Caching and Writeback Policies in Parallel File Systems," 1991, IEEE Symp. on Parallel Distributed Processing, pp. 60–67.

S. Moyer et al., "PIOUS: A Scalable Parallel I/O System for Distributed Computing Environments," 1994, In Proc. of the Scalable High–Performance Computing Conference, pp. 71–78.

W. Ng et al., "The systematic improvement of fault tolerance in the Rio file cache," 1999, In Proc. of 1999 Symposium on Fault–Tolerant Computing, pp. 76–83.

N. Nieuwejaar et al., "The Galley parallel file system," 1997, Parallel Computing, 23(4):447–476.

B. Nitzberg, "Performance of the iPSC/860 Concurrent File System," 1992, Technical Report RND–92–020, NAS Systems Division, NASA Assoc Research Center.

N. Peyrouze et al., "An efficient fault–tolerant NFS server designed for off–the–shelf workstations," 1996, IEEE Proceeding of 1996 Symp on Fault–Tolerant Computing, pp. 64–73.

P. Pierce, "A concurrent File System for a Highly Parallel Mass Storage Subsystem," 1989, In Proc. of the Fourth Conf. on Hypercube Concurrent Computers and Applications, pp. 155–160.

A. Purakayastha et al., "ENWRICH: A compute–processor write caching scheme for parallel file systems," 1996, ACM Press In Proc. of the Fourth Workshop on Input/Output in Parallel and Distributed Systems, pp. 55–68.

K.E. Seamons et al., "Server–Directed Collective I/O in Panda," 1995, In Proc. of Supercomputing, IEEE, pp. 1–14.

R. Thakur et al., "Passion: Optimized I/O for Parallel Applications," 1996, IEEE Computer, 29(6):70–78.

* cited by examiner

METHOD AND APPARATUS FOR IMPROVING WRITE PERFORMANCE IN A CLUSTER-BASED FILE SYSTEM

CROSS-REFERENCE TO RELATED APPLICATIONS

This application is related to the following co-pending and commonly assigned patent applications, which applications are incorporated by reference herein:

U.S. patent application Ser. No. 09/755,858, METHOD AND APPARATUS FOR SUPPORTING PARITY PROTECTED RAID IN A CLUSTERED ENVIRONMENT", by Lawrence Yium-chee Chiu et. al., filed on Jan. 5, 2001;

U.S. patent application Ser. No. 09/851,452, filed on May 7, 2001, entitled "METHOD AND APPARATUS FOR A GLOBAL CACHE DIRECTORY IN A STORAGE CLUSTER", by Lawrence Yium-chee Chiu et. al., and U.S. patent application Ser. No. 09/851,468, filed on May 7, 2001, entitled "METHOD AND APPARATUS FOR CACHE SYNCHRONIZATION IN A CLUSTERED ENVIRONMENT", by Lawrence Yium-chee Chiu et. al.

BACKGROUND OF THE INVENTION

1. Field of the Invention

The present invention relates to data storage systems, and in particular, to a method and apparatus for utilizing cache in a number of storage nodes in a cluster storage subsystem.

2. Description of the Related Art

The ability to manage massive amounts of information in large scale databases has become of increasing importance in recent years. Increasingly, data analysts are faced with ever larger data sets, some of which measure in gigabytes or even terabytes. To access the large amount of data, two or more systems that work together may be clustered. Clustering provides a way to improve throughput performance through proper load balancing techniques. Clustering generally refers to multiple computer systems or nodes (that comprise a central processing unit (CPU), memory, and adapter) that are linked together in order to handle variable workloads or to provide continued operation in the event one computer system or node fails. Each node in a cluster may be a multiprocessor system itself. For example, a cluster of four nodes, each with four CPUs, would provide a total of 16 CPUs processing simultaneously. Practical applications of clustering include unsupervised classification and taxonomy generation, nearest neighbor searching, scientific discovery, vector quantization, time series analysis, multi-dimensional visualization, and text analysis and navigation. Further, many practical applications are write-intensive with a high amount of transaction processing. Such applications include fraud determination in credit card processing or investment house account updating.

In a clustered environment, the data may be distributed across multiple nodes that communicate with each other. Each node maintains a data storage device, processor, etc. to manage and access a portion of the data that may or may not be shared. When a device is shared, all the nodes can access the shared device. However, such a distributed system requires a mechanism for managing the data across the system and communicating between the nodes.

In order to increase data delivery and access for the nodes, cache may be utilized. Cache provides a mechanism to store frequently used data in a location that is more quickly accessed. Cache speeds up data transfer and may be either temporary or permanent. Memory and disk caches are utilized in most computers to speed up instruction execution and data retrieval. These temporary caches serve as staging areas, and their contents can be changed in seconds or milliseconds.

In the prior art, caching and prefetching strategies are often complicated, confusing, based on scientific workloads for cache management, and designed to guard against file cache corruption due to application faults and power failures with unreliable file systems. Accordingly, what is needed is a storage and caching system that is efficient, does not require special hardware support, and provides sufficient reliability.

SUMMARY OF THE INVENTION

To address the requirements described above, the present invention discloses a method, apparatus, article of manufacture, and a memory structure that provides a mirrored-cache write scheme in a cluster-based file system. When a user application or host issues a write request from a node, the data is written to the cache of both the receiving node (referred to as node i) and a partner of the receiving node (referred to as node i+1). In one or more embodiments of the invention, node i's partner is always node i+1, except for the last node, whose partner is node 0 instead.

A global cache directory manager (that may or may not be used depending on the implementation) is embedded in a file system and checks to determine if the data being written is currently owned by another node (referred to as a remote node). If so, the cache directory manager invalidates the copy in the remote node based on an invalidation protocol. Once invalidation is complete, node i writes the data to its own local file cache. Node i may also write the data to the node i+1 and to disk as a nonblocking write (asynchronous write). Once node i receives confirmation of the completed cache write from node i+1, the user/host write can return.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
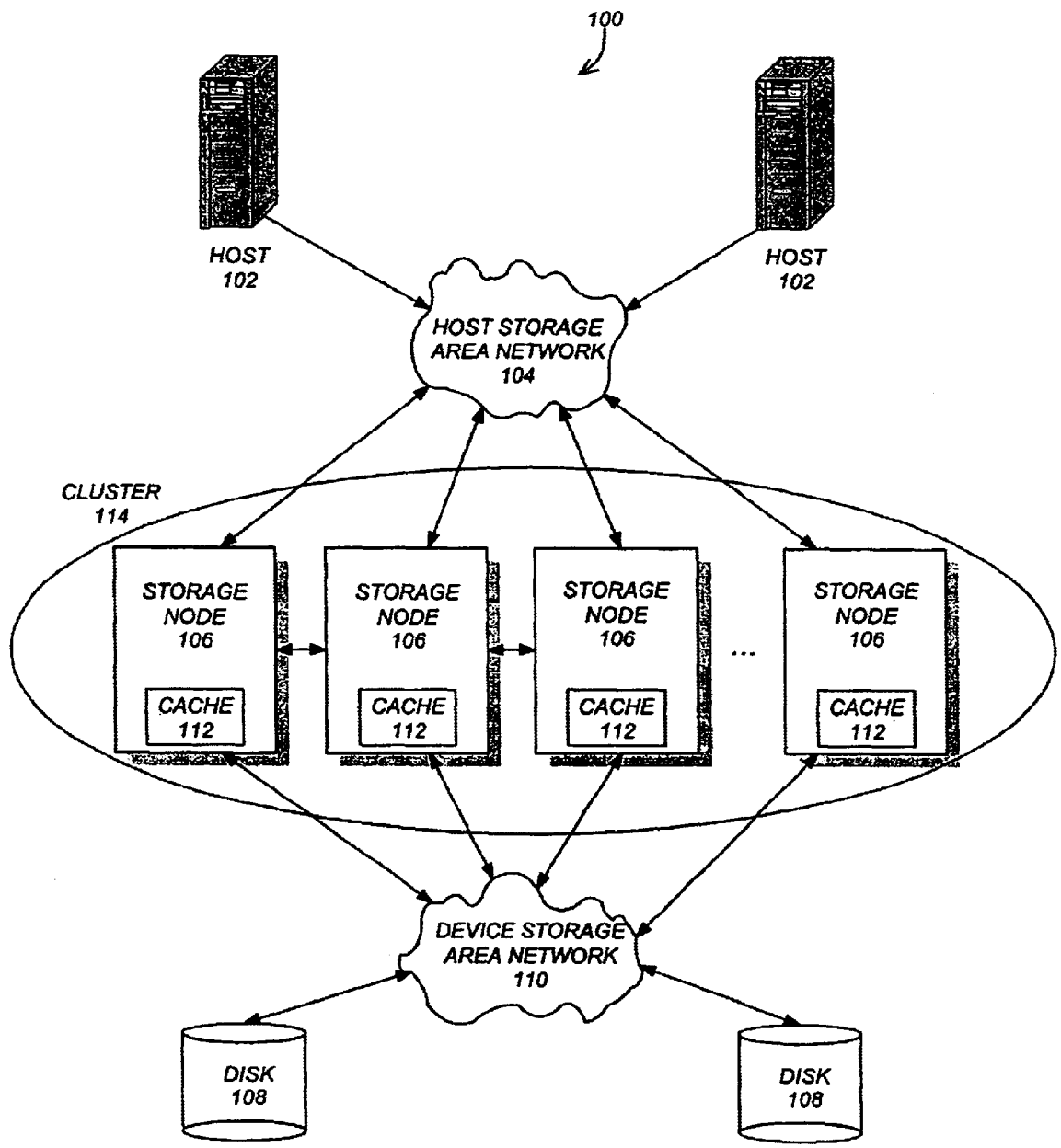
FIG. 1 is a block diagram showing a hardware environment in accordance with one or more embodiments of the invention.

FIG. 1 is a block diagram showing a hardware environment in accordance with one or more embodiments of the invention. A cluster storage subsystem 100 is comprised of one or more hosts 102 (also referred to as clients or users) in a host storage area network 104, a number of cache storage nodes 106 in a storage cluster 114, and one or more storage disks 108 in a device storage area network 110. The hosts 102 view the storage cluster 114 as a single logical image of storage. Further, hosts 102 can connect to the cluster 114 through any storage node 106. Additionally, the hosts/users 102 may run user applications.

Each storage node 106 is a processing and management unit in a large storage cluster 114. Typically, a storage node 106 comprises a processor, an amount of cache memory 112, a host end interface that enables communication across the host storage area network 104 with hosts 102, a device end interface that enables communication across the device storage area network 110 with disks 108, and an inter-node interface that enables communication with other storage nodes 106. In one or more embodiments, the system 100 implements a cache-coherence protocol to ensure data consistency among cluster 114 nodes 106. The hosts 102, nodes 106, and disks 108 can be interconnected to other devices via a local area network, wide area network, internet, or other means of providing communications. Further, all of the storage nodes 106 may have a direct access path to any disk 108. Further, the data stored on disks 108 may be protected through either software or hardware RAID (redundant array of independent disks) technology.

In one or more embodiments, the hosts 102, nodes 106, and disks 108 each include one or more processors that execute the logic necessary to accomplish the present invention. This logic may be stored in memory, loaded from a fixed or removable data storage device, or accessible from some other device across the host storage area network 104, the device storage area network 110, or some other communications medium.

Mirrored Cache Write

Figure 2:
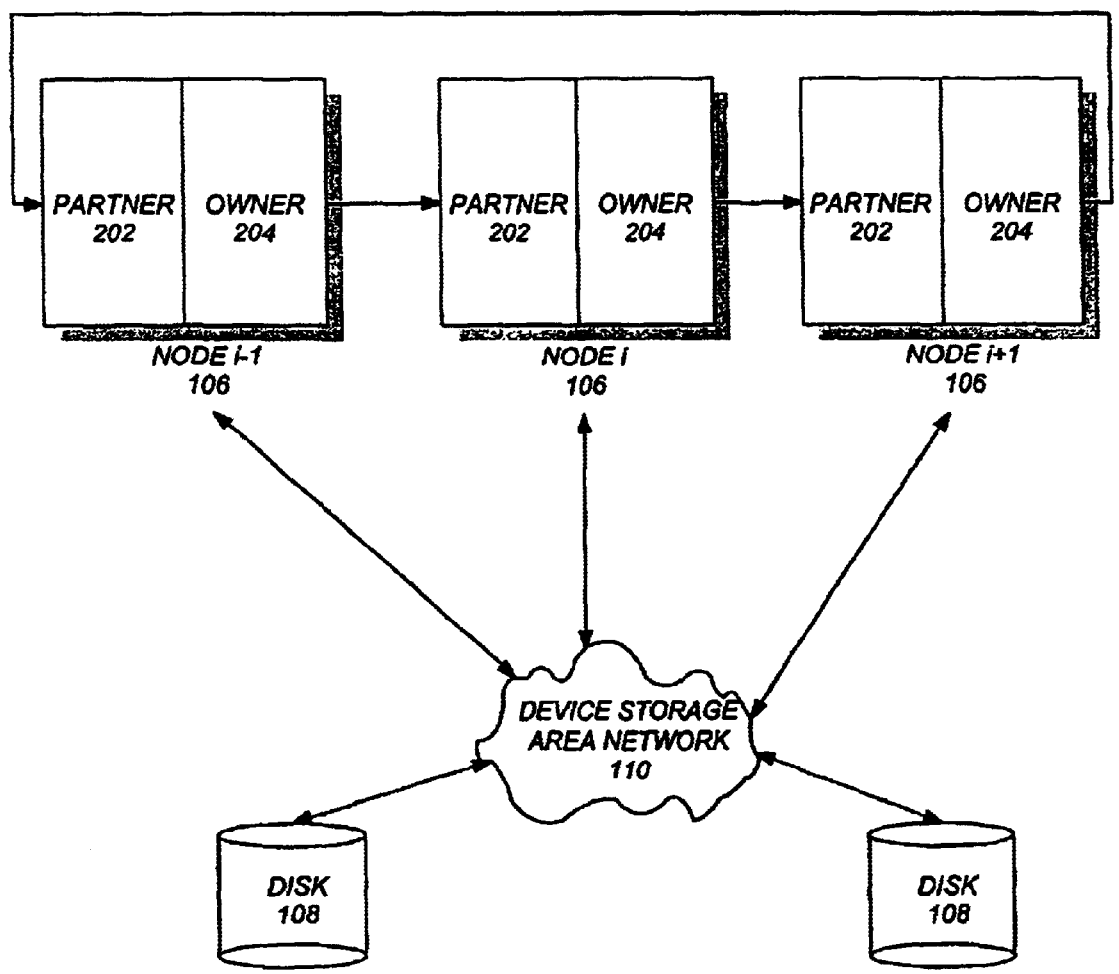
FIG. 2 illustrates an owner-partner relationship in a cluster-based file system in accordance with one or more embodiments of the invention.

One or more embodiments of the invention use a mirrored-cache 112 write scheme for cache 112 in a storage cluster 114. Under a mirrored-cache 112 write scheme, when a user application or host 102 issues a write request from/to a node 106 (referred to as node "i"), the data is written to both the file cache 112 of node i and the file cache 112 of a second node 106 (referred to as node "i+1"). In such embodiments, node i may be referred to as "the owner of the data", and node i+1 as "the partner of node i". The data copy in node i's file cache 112 is "the primary data copy", and the copy in node i+1's cache 112 is "the secondary data copy". FIG. 2 illustrates such an owner-partner relationship in a cluster-based file system 100 in accordance with one or more embodiments of the invention. For reference purposes, the partner (i+1) 202 of an owner node (i) 204 may always be node i+1, except for the last node 106, whose partner 202 may be node 0 instead.

A global cache directory, that maintains information on which node 106 contains a most up-to-date copy of data, may be utilized in one or more embodiments of the invention. If a global cache directory is utilized, the directory may be managed by a global cache directory manager. The description below may refer to the use of a global cache directory. Such use of the directory may not be required depending on the implementation.

When a write request arrives at node i, a global cache directory manager embedded in the file system 100 may first check if the data written is currently owned by another node 106 (referred to as a remote node). If the data is owned by a remote node 106, the cache directory manager may invalidate that copy in the remote node 106 based on an invalidation protocol. The invalidation protocol choice may depend on how the global file cache directory scheme works. In one or more embodiments, the global directory manager may be distributed across multiple nodes 106 or reside on one node 106. Various invalidation protocols may be valid regardless of the type of global file cache directory scheme, if any, that is used.

Once the invalidation is complete, node i writes data to its own local file cache 112 (such that node i becomes the owner 204 of the data). Concurrently, node i writes data to node i+1 (such that node i+1 becomes the partner 202 of node i), and may also write data to disk 108 as a nonblocking write (asynchronous write). Node i may not have to wait for the write to be flushed to disk 108.

Once node i+1 receives data, node i+1 keeps the data in its file cache 112 and replies to node i. When node i 106 receives the reply from node i+1, the host 102 write can return. The overall response time for a write request may be calculated by determining the sum of the time to write the data to a node's 106 local file cache 112 and the time to write to its partner's 202 file cache 112 (if the cache 112 invalidation overhead is ignored).

Figure 3:
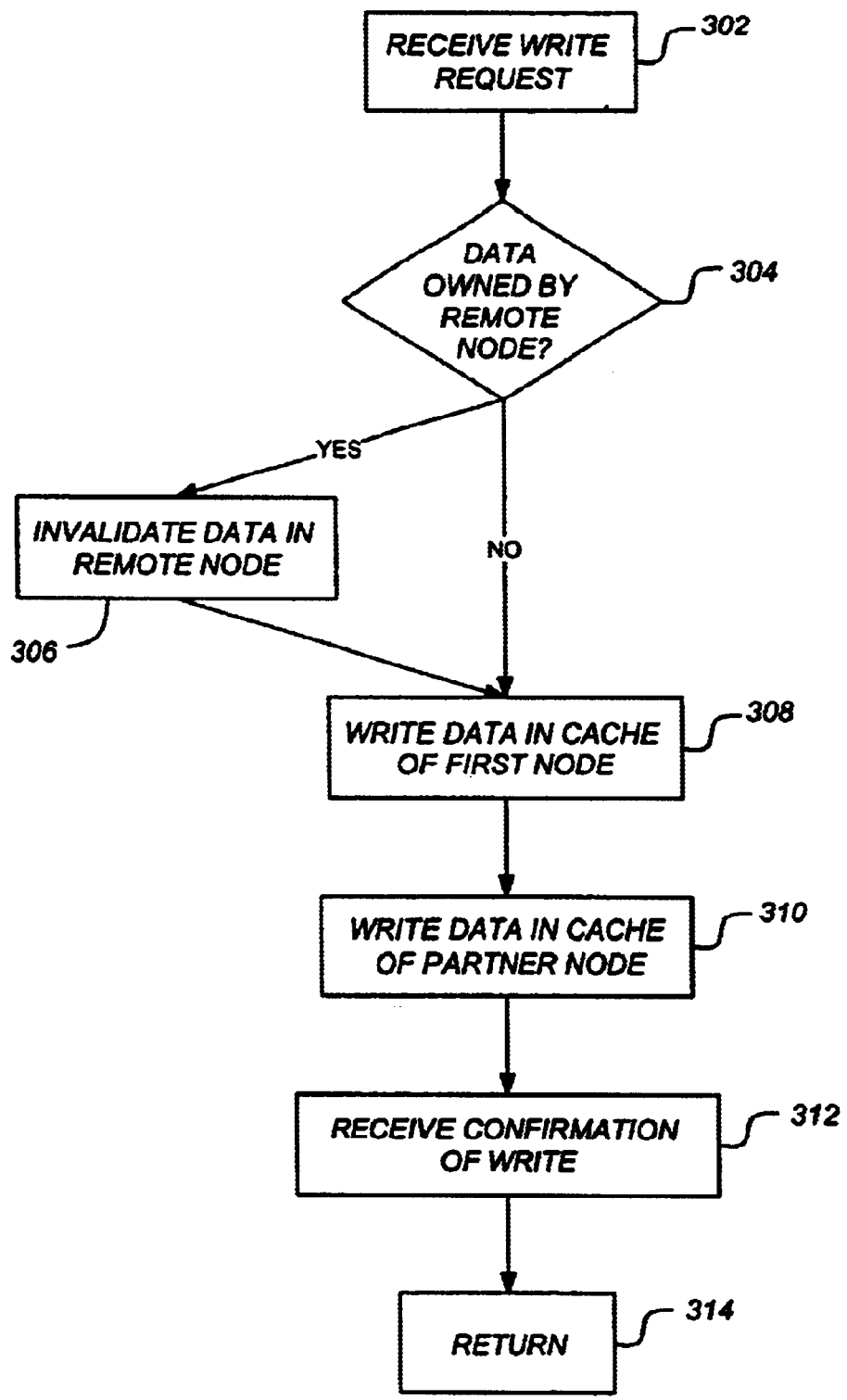
FIG. 3 is a flow chart illustrating the use of a mirrored-cache write scheme in accordance with one or more embodiments of the invention.

FIG. 3 is a flow chart illustrating the use of a mirrored-cache write scheme in accordance with one or more embodiments of the invention. At step 302, a write request is received in the first node 106. At step 304, a determination is made as to whether the data is owned by a remote node 106 (e.g., by a global cache 112 directory manager). If the data is owned by a remote node, the data may be invalidated, if necessary at step 306. In one or more embodiments, the data may not need to invalidated because the global cache 112 directory maintains information regarding which node 106 has the most up-to-date copy of the data. However, switching the directory entry in the global cache 112 directory may be viewed as invalidating the data.

At step 308, the data is written in the cache 112 of the first node 106. At step 310, the data is written in the cache 112 of the partner node 202. At step 312, the partner node 202 confirms the cache 112 write to the first node 106. At step 314, the write is returned to the host/user 102. Additionally, an asynchronous write to disk 108 may be performed.

Cache Partitioning

Since duplicate data copies may consume more file cache 112 than non-duplicate copies, unless mirroring is controlled, duplicating the data written in cache may reduce the cache 112 space available for reads, and hence degrade read performance. Cache 112 partitioning may be used to control the cache 112 space in an attempt to optimize both read and write performance.

To control the cache 112 space used by the mirrored data copy (i.e., data stored in a node 106 partner 202), each node 106 may impose a dynamically adjusted upper bound on the space used by the mirrored cache 112 data, (e.g., "x" cache lines). Different owner 204 and partner 202 pairs may have different x values, but each owner 204 and partner 202 pair may be required to agree on the same x value.

The x value may be periodically adjusted based on the observed workload pattern in the node 106. If the node 106 observes a read-intensive workload, it may be beneficial to reduce x (i.e., the number of cache 112 lines available for writing data) and devote larger cache 112 for reads. If the node 106 observes a write-intensive workload, the node 106 may decide to increase x (i.e., the number of cache 112 lines available for writing data) and devote less cache 112 for reads. Such workload statistics may be gathered periodically. Each time a node 106 makes a change to the amount of cache 112 space available for writing (i.e., the value of x), the node's 106 partner 202 is informed with the change as well. In one or more embodiments, the initial value of x may be set to a small fraction of the total file cache 112 size, (e.g., twenty (20) percent (%)).

Figure 4:
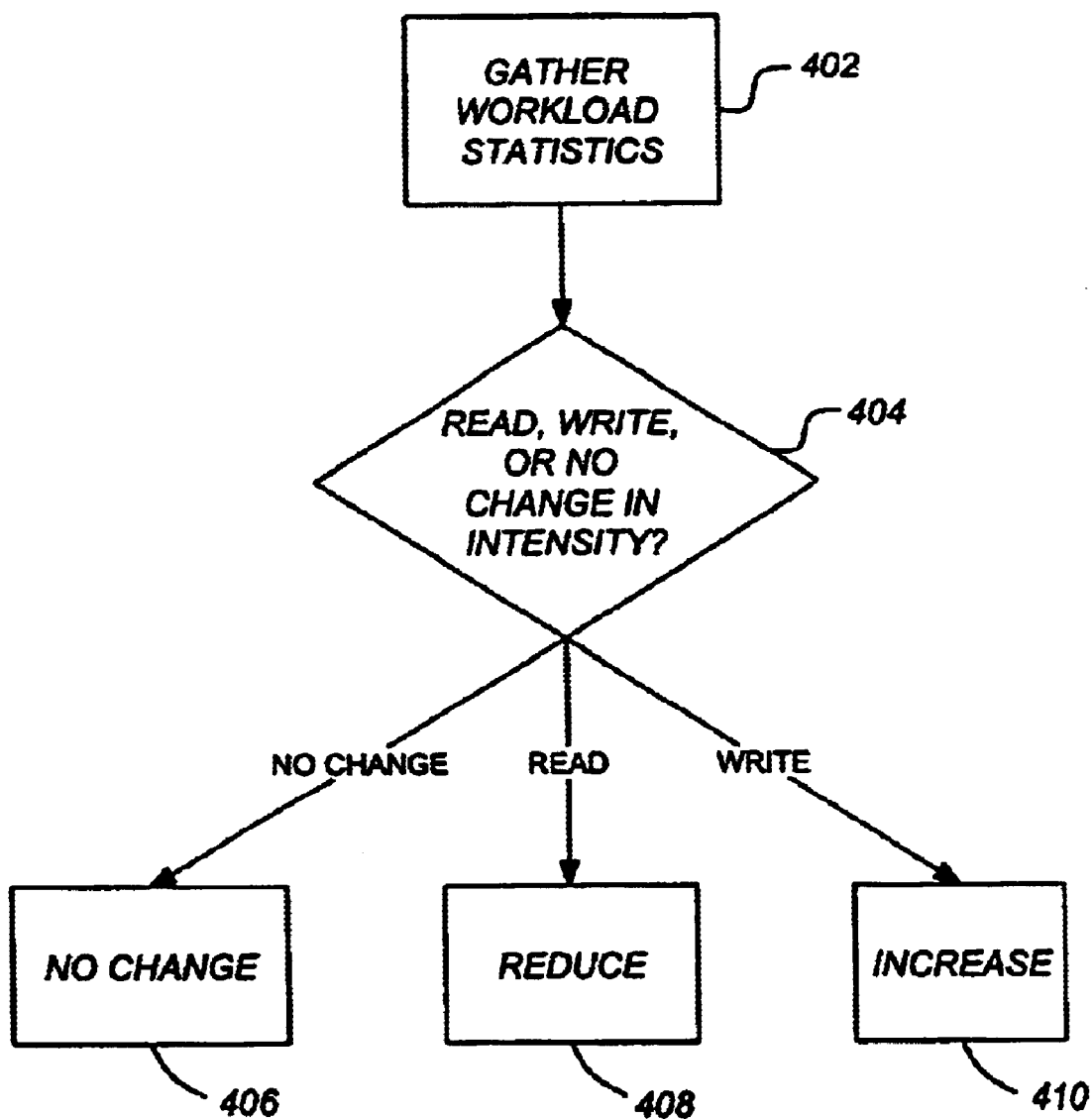
FIG. 4 is a flowchart illustrating the dynamic adjustment of an upper bounds in accordance with one or more embodiments of the invention.

Such dynamic adjustment is illustrated in the flowchart of FIG. 4. At step 402, workload statistics are gathered. At step 404, a determination is made regarding whether a change in intensity is observed. If there is no change, the upper bound is not adjusted at step 406. If a read-intensive workload is observed, the upper bound may be reduced at step 408. If a write-intensive workload is observed, the upper bound may be increased at step 410.

Each node 106 may maintain a counter on the number of cache 112 lines that are being used (i.e., that have data written in them). Initially, the mirrored-cache 112 space is set to contain x cache 112 lines. Each time when the node 106 writes to a new cache 112 line which has never been written before, that node 106 increments the counter by 1. When the node 106 overwrites a cache 112 line that has been written before, the counter is not incremented. The cache 112 accesses may be based on hashing the data addresses.

The following example illustrates the use of a counter and a hash table for writing data to cache 112. When a written cache 112 line counter reaches the upper bound (e.g., x), the next time a write that requires a new cache 112 line arrives at the node 106, node 106 first checks to see if any of the asynchronous writes (i.e., the asynchronous writing of the data to disk 108 performed when data is written to local cache 112 and to a partner's 202 cache 112) are done. If there are completed asynchronous writes, the node 106 places a notation on the cache 112 lines that have been completely written to disk 108, and adds those cache 112 lines to a free list. Additionally, the node 106 may decrement the counter by the number of cache 112 lines that have been written to disk 108. Subsequently, the node 106 may proceed to write the new data to its local cache 112. Accordingly, the node 106 may be referred to as an owner node 204 of the data in cache 112.

Figure 5:
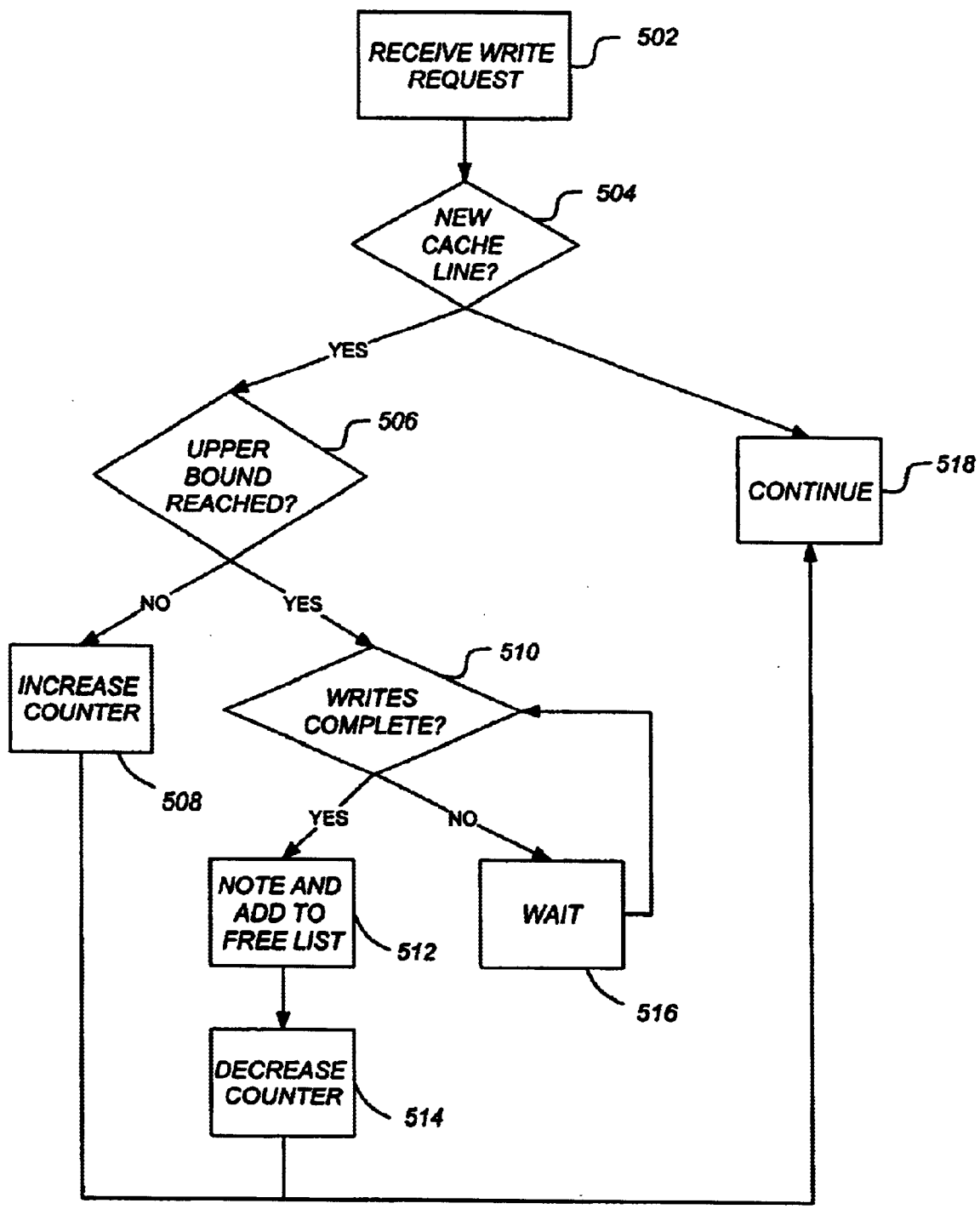
FIG. 5 is a flow chart illustrating the use of the upper bounds in accordance with one or more embodiments of the invention.

FIG. 5 is a flow chart illustrating the use of the upper bound in accordance with one or more embodiments of the invention. At step 502, the node 106 receives a write request. At step 504, a determination is made regarding whether the write requires a new cache line. If so, a determination is made at step 506 regarding whether the upper bound has been reached. If the upper bound has not been reached, the counter is increased at step 508. However, if the upper bound has been reached, the node 106 determines if any asynchronous writes have been completed at step 510. If so, node 106 makes a note on the cache 112 lines completely written and adds the line to a free list at step 512. At step 514, the counter is decreased by the number of cache lines that have been completely written to disk 108. However, if no writes are complete, the node 106 waits until a write is complete at step 516. At step 518, processing continues with writing to the cache 112 line as described in FIG. 3.

When an owner node 204 mirrors the data to its partner node 202, owner node 204 may piggyback the data to be written with the note that indicates which caches 112 line have been flushed to disk 108 by the asynchronous write operation. By transmitting the note to partner node 202, partner node 202 (e.g., node i+1) can reuse the cache 112 lines that have been flushed to disk 108 to store new mirrored data. If none of the previously issued asynchronous writes have been completed, the owner node 204 must wait until at least one of the asynchronous writes is completed. Thus, the counter is used to ensure that the mirrored cache 112 in partner node 202 never exceeds the specified threshold (e.g., x).

Merely because a cache 112 line is flushed to disk does not necessarily mean that the cache 112 line will be replaced immediately. A cache 112 replacement policy may not decide to replace the cache line 112 yet. Further, the counter may only be used to maintain the number of "active write" cache 112 lines (i.e., the cache 112 lines that contain written data that have not yet been flushed to disk).

In the mirrored cache 112 scheme, the mirrored data copies in partner node 202 can be used to serve user/host 102 requests. Further, the scheme allows read requests to use the cache 112 space that is not used by the mirrored writes. The upper bound of the mirrored cache 112 space (e.g., x) may only be used to avoid writes to pollute the read cache. Further, in one or more embodiments, a mirrored cache 112 line may be replaced only when the data owner node 204 provides permission (e.g., by piggybacking the disk 108 flushing information).

Cache 112 Invalidation Protocol

Under a cache-coherency protocol, data may be owned by different nodes 106 at different times. For instance, if a first node 106 (e.g., node i) updates data (referred to as "a"), there may be a primary data copy for data "a" on one node 106 (e.g., node i) and a secondary data copy (referred to as "a") on the first node's 106 partner node 202 (e.g., node i+1). Subsequently, if a second node 106 (e.g., node j) writes/updates data "a", the first node's 106 (e.g., node i's) copy needs to be invalidated, and the first node's 106 partner node 202 (e.g., node i+1) needs to know that the first node's 106 (e.g., node i) data copy is no longer valid.

To inform the first node's 106 partner node 202 (e.g., node i+1) about the invalidation, the second node 106 (e.g., node j) sends an invalidation notice to both the first node 106 (e.g., node i) and the first node's 106 partner node 202 (e.g., i+1). Once the second node (e.g., node j) receives acknowledgments from both the first node 106 (e.g., node i) and the first node's 106 partner node 202 (e.g., node i+1), the second node (e.g., node j) can proceed with the write operation.

As described above, in one or more embodiments of the invention, a global cache directory may be utilized and maintains information regarding which node 106 contains the most up-to-date copy of data. Accordingly, in the example above, if a global cache directory is used, there may be no need for the second node 106 (e.g., node j) to send an invalidation notice/message to the first node's 106 partner node 202 (e.g., node i+1).

Recovery

The use of the mirrored cache 112 scheme enables an efficient method for recovering data in the event a node (e.g., node i) crashes or data in the node 106 is lost. Additionally, the mirrored cache 112 scheme enables multiple simultaneous node failures, as long as the failing nodes do not include both the owner 204 and partner 206 for the same cache. As described above, in the mirrored cache 112 scheme, the owner node's 204 partner node 202 (e.g., node i+1) maintains another copy of the data written in the owner node's 204 file cache 112. The mirrored copy found in the partner node's 202 (e.g., node i+1) cache should be the most up-to-date copy of the data. Accordingly, in the event of the owner node's 204 (e.g., node i) failure, the recovery process can recover from failure using the partner node's 202 (e.g., node i+1) mirrored copy. Such recovery may be proven by contradiction as follows.

For reference purposes the owner node 204 is referred to as node i, and the owner node's 204 partner node 202 is referred to as node i+1. Assuming that the mirrored copy on node i+1 is not the most up-to-date copy, then the most up-to-date copy must be in some other node's 106 cache 112 or on disk 108. If the most up-to-date copy is in some other node's 106 cache 112, node i+1's cache 112 copy must have been invalidated based on the cache-invalidation protocol. Accordingly, it should not have been possible to find a copy in node i+1's cache 112 at all. This inability demonstrates a contradiction.

If the most up-to-date copy of the data is on disk 112, then either a copy of the data is not located in any nodes' 106 file cache 112, or a valid copy is located in some node's 106 file cache 112 or its partner's 202 mirrored file cache 112. Supposing that a valid copy is located in node k's file cache 112, node k must have the most up-to-date data copy and the data copy in node i+1's mirrored cache 112 should have been invalidated based on the invalidation protocol. Accordingly, another contradiction is demonstrated.

If a valid copy of the data is located in node k+1's mirrored cache 112 but not in k's file cache 112, then node k's data copy must have been flushed to disk 108 and the delayed notice has not been sent by node k to node k+1 (the notice on node k may be reviewed for confirmation). Otherwise, node k+1's mirrored file cache 112 should not contain the data copy. Thus, node k+1's mirrored cache 112 and disk 108 should both contain the most up-to-date copy. If this is true, node i+1's data copy must have been invalidated. Accordingly, another contradiction is demonstrated.

Adding and Removing Cluster Nodes 106

The mirrored-cache 112 scheme may be extended to support on-line removal or addition of cluster 114 nodes 106 with small overall system performance perturbation during the addition or removal process. Adding or removing a cluster 114 node 106 primarily involves how the workload will be redistributed, and how the affected nodes 106 can establish their owner-partner relationship properly. Various approaches for adding and/or removing nodes may be utilized as follows:

Removing a Node 106

Removing a node 106 is somewhat different from taking a failed node offline, although the difference is small. Accordingly, the description below first describes an approach to remove a working cluster node 106 on-line. Thereafter, the changes that may need to be made when a failed node 106 is taken offline is described.

Removing a Working Node 106 From the Cluster 114

To remove a working cluster node i, there are three major tasks: (1) Node i should ensure that all of the written data on i is safely stored, either on other cluster nodes 106 or on disk 108; (2) Node i−1 and node i+1 should establish an owner-partner relationship so that node i−1's mirrored copy can be replicated on node i+1 once node i is taken offline; and (3) The global cache directory manager, if used, should ensure that the directory information is consistent with the information stored in node i−1 and i+1's caches 112.

Approaches to solve this problem may be divided into two categories based on two different goals: (1) To shorten the window from the time when node i becomes unavailable (i.e., when node i stops accepting new I/O requests) to the time when node i is removed; and (2) To simplify implementation and still accomplish the node 106 removal task. By satisfying the first goal of shortening the window, the performance impact on applications may be reduced and graceful load balancing among the remaining cluster 114 nodes 106 may be allowed. Such advantages may be important for applications/hosts 102 that are vulnerable to load changes and node 106 unavailability. However, to achieve the first goal may require a relatively complicated node 106 removal scheme that can be difficult to implement. To satisfy the second goal, the first goal may be relaxed. The description/examples below illustrate approaches under these two goals.

Removing a Node 106 with Minimal Performance Impact

To remove a node 106 with a minimal performance impact, various approaches may be used. Examples of some of these approaches include: (1) Both node i−1 and node i flush the dirty data to disk 108; (2) Both node i−1 and node i forward mirrored cache 112 data copies to appropriate cluster nodes 106; and or (3) hybrids of (1) and (2) such that node i−1 may flush its dirty pages and node i forwards its mirrored cache 112 copies, or vice versa. Since method (3) is a hybrid of the first two approaches, a detailed description of such an approach is not described herein.

The first approach provides for flushing dirty written data to disk 108. Since node i is node i−1's partner 202 and is node i+1's mirrored cache 112 owner 204, once node i is taken offline, node i−1's mirrored copy will be lost, and node i's written data will be lost as well. Therefore, only one copy of written data for node i−1 and node i is left after node i is taken offline. To ensure that node i−1 and i's written data is protected, embodiments may force the written data to disk 108 or may provide for new duplicate copies of node i−1 and node i's written data. When forcing the data to disk, the following steps may be performed:

(1) When node i receives a command to remove itself, node i first synchronizes its written cache 112 lines to disk 108. Meanwhile, node i may also send a message to node i−1 to notify node i−1 of node i's removal. Thereafter, all of the subsequent new writes to node i after node i has received the removal command may be synchronously written to disk 108 directly. Node i may not ask the global cache 112 directory manager to update the cache 112 directory entry. Accordingly, the subsequent reads/writes on the same data must be found from disk 108. During data flushing, when new writes arrive at node i, node i may be responsible for ensuring that the correct write order is used so that the new writes always override the old data.

(2) When node i−1 receives the notice from node i, node i−1 starts to flush its dirty cache lines in the same manner as node i.

(3) Once node i−1 completes its flushing, node i−1 may send a "flushing done" message to node i. Meanwhile, node i−1 may also tell the global cache directory manager, if used, that i−1 is ready to mirror its new writes to node i+1 via an "I'm ready" message.

(4) Once the global cache directory manager receives node i−1's message, the manager may remove all of the directory entries that are owned by node i so that subsequent requests can find data from disk 108.

Once node i finishes flushing its own dirty cache 112 data, node i sends a notice to node i+1 to inform node i+1 that node i is to be removed. Subsequently, node i may stop accepting new I/O requests from users/hosts 102 after both node i−1 and node i's dirty data is flushed to disk 108.

Additionally, even though node i does not accept any new requests from users/hosts 102, it may still receive invalidation messages from the global cache 112 directory manager. Thus, in one or more embodiments, node i is not taken offline until the global cache 112 directory manager ensures consistent directory states.

(5) When node i+1 received node i's notice, node i+1 knows that node i has flushed dirty pages to disk 108, and is going to be taken offline. Thereafter, node i+1 can expect mirrored writes from node i−1 instead of node i. Accordingly, node i+1 may remove all the mirrored cache 112 entries for node i. Meanwhile, node i+1 may inform the global cache directory manager that it is ready to take mirrored requests from node i−1.

(6) Once the global cache 112 directory manager receives i+1's messages, the manager may remove all the directory entries that are owned by node i. After the global cache 112 directory manager receives "I'm ready" messages from both node i−1 and node i+1, the manager may send a message to node i to inform node i that node i can be removed.

(7) When node i receives the message from the global cache directory manager that node i can be removed, node i can be taken offline. In one or more embodiments of the invention, the total window from the time node i stops accepting new requests to the time it is taken offline is small (e.g., only 3 message latency times).

When node i−1 receives the message from the global cache 112 directory manager, all the subsequent writes can be mirrored to node i+1 directly without flushing to disk 108.

As described above, there is no assumption regarding the use of a global cache 112 directory or global cache 112 directory manager. Further, if a global cache 112 directory and manager is utilized, the global cache 112 directory manager may reside on only one node 106 (or may not depending on the implementation). If the global cache 112 directory manager is distributed across multiple nodes 106, node i may need to send notice to multiple nodes 106 that contains distributed global cache 112 directory information. Furthermore, if part of the directory information is on node i itself, the directory information may need to be offloaded to other nodes 106 first before node i is taken offline.

Figure 6:
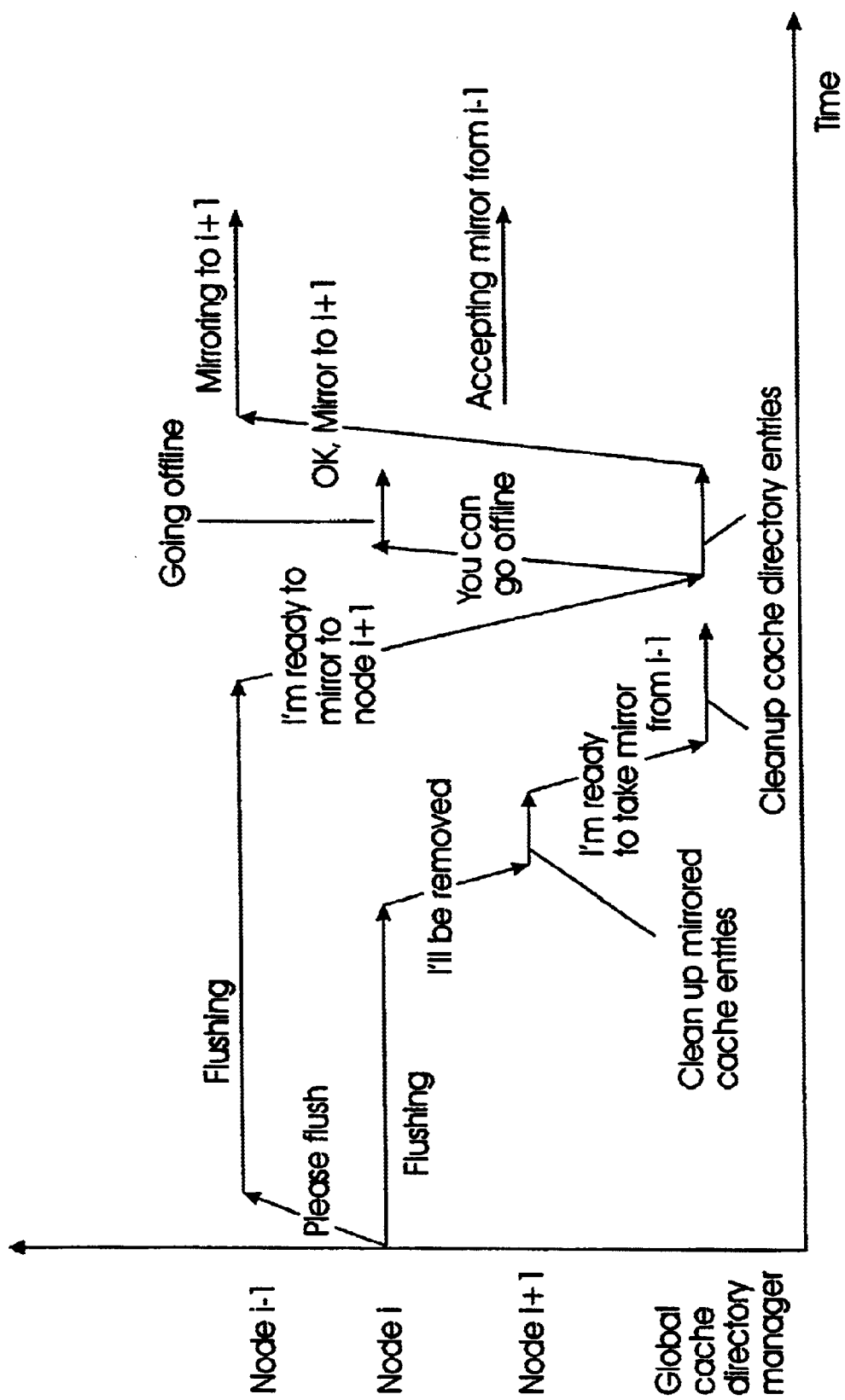
FIG. 6 illustrates a graphical representation of the steps involved in handling node removal in accordance with one or more embodiments of the invention.

FIG. 6 illustrates a graphical representation of the steps involved in handling node 106 removal using the file cache 112 flushing approach in accordance with one or more embodiments of the invention. Note that in FIG. 6, it is assumed that the flushing time on node i−1 is longer than for node i. Such timing may not be the case in reality. The removal of node i may not be permitted until both i−1 and i's dirty data are flushed to disk 108 and the global cache 112 directory notifies node i. Similarly, the global cache 112 directory manager may receive node i−1's "I'm ready" message first. However, the global cache 112 directory manager may not ask node i−1 to mirror data to node i+1 until both node i−1 and node i+1 have transmitted "I'm ready" messages.

The second approach is that of mirrored-cache copy forwarding. The first scheme/approach described above may be conservative in that it forces node i and node i−1 to synchronize written file caches 112 to disk 108. Such an approach may function normally when written file caches 112 are relatively small. When written file caches 112 are not relatively small, write cache 112 flushing may take longer to process and removing a cluster node 106 may introduce significant performance fluctuation. Accordingly, in one or more embodiments, node i may duplicate node i−1's mirrored write cache 112 to node i+1 and let node i+1 duplicate node i's mirrored cache 112 to node i+2. Using such an embodiment, the fail-over chain may be re-established between node i−1 and node i+1 quickly.

The detailed procedure for such an embodiment follows:

(1) First, node i notifies node i+1 about its removal.

(2) Once node i+1 receives node i's notice, node i+1 knows that it needs to replicate node i's data to node i+2. By replicating the data, once node i is removed, node i's write data is protected by the copies on node i+1 and node i+2. To achieve such replication, node i+1 "reads" the mirrored cache 112 data on node i, and "writes" the data to its file cache 112 as if a host 102 had issued write requests on the data in the mirrored cache 112. Based on the mirrored-cache 112 scheme, node i+1 has a partner node 202 i+2. Accordingly, the writes are replicated to node i+2. Furthermore, the written data copies in node i may be invalidated based on an invalidation protocol. Thus, the global cache 112 directory may be updated appropriately.

New write requests that arrive at node i after node i has sent notice to node i+1 (of node i's removal) are redirected to node i+1 as if the requests had originally arrived at node i+1. When the forwarded requests are returned from node i+1, node i+1 forwards the returns to node i so that node i can return control to user applications/hosts 102. Node i+1 may be responsible for ensuring that write operations are performed in the correct order such that the new writes always override the old data.

Meanwhile, node i may also forward the mirrored data requests and the invalidation requests for node i−1's mirrored data to node i+1.

(3) Node i+1 may not acknowledge node i's notice until all of node i's mirrored data on node i+1 is duplicated on node i+2. Once node i receives the acknowledgment from node i+1 and all the mirrored data for node i−1 has been forwarded to node i+1, node i knows that all the written data on node i has been successfully forwarded to node i+1 and node i+2.

Accordingly, node i may send the global cache 112 directory manager a notice (if a global cache 112 directory and manager are utilized). Meanwhile, node i may stop accepting new I/O (input/output) requests. Once the global cache 112 directory manager receives the notice, the manager may update its cache 112 directories by removing node i's caching information from the directory. Thereafter, subsequent requests can proceed as normal.

Removing a Node On-Line Using Extra Cache 112 Directory Information and Hash Tables The first approach above provides a method for removing a node with the goal to minimize the window time for workload redistribution. The second approach may not require such a goal. One or more embodiments of the second approach may rely on two conditions: First, each node 106 has a local cache 112 directory that contains additional information on who the partner 202 is in the form of a phase number. Second, each node 106 may tell whether all of the dirty cache 112 lines written before a given time have been flushed to disk 108 or not.

A global cache 112 directory may also maintain information regarding who the partner 202 is in the form of a phase number. In different phases, the node's 106 partner 202 may be different. If node i's partner 202 can only be node i+1 or node i+2, then one bit per directory entry may suffice. In one or more embodiments, the local cache 112 directory and global cache 112 directory may be the same. However, the description does not make any assumptions regarding the implementation of the global cache directory structure and a variety of such structures that may or may not be disclosed herein may be utilized.

In one or more embodiments, node i−1's partner 202 is node i. The phase number for each global cache 112 entry may be 0. During the time when node i is removed, the new writes are replicated on node i+1, so that some of the cache 112 entries may have phase number 1. If node i−1's partner can only be node i or node i+1, only one bit may be needed for the phase number. Phase numbers may vary and may not be limited or restricted to 0. If a phase number is 1, the phase number for the node 106 removal phase may be 0. For each phase, there is a different partner node 202 for node i−1. For instance, if the cache 112 entries have phase number 0 and belong to node j, their duplicate copies may be found in node j+1. In another example, the cache 112 entries that have phase number 1 and belong to node j, their duplicate copies may be found in node j+2. An indirect lookup table may be used to indicate who the node's partner 202 is in different phases.

Under a scheme that utilizes phase numbers, updates to the global cache 112 directory information may need to carry the phase number information. For instance, when node i is to be removed, and a write is issued on node i−1 after node i−1 is informed with node i's removal, the directory entry corresponding to the new write will have a new phase number. The indirect lookup table can be used to find the node's partner 202.

As described above, the second condition is that each node 106 can tell whether the dirty cache 112 lines written before a given time, t, have been flushed to disk 108 or not. Such knowledge in each node 106 may be necessary to ensure that the node i−1's cache 112 lines that are replicated to node i are safely flushed to disk 108 before i is removed. A clock algorithm may be used to provide such knowledge. Alternatively, each node may use a hash table based approach.

In a hash table based algorithm, it is assumed that node i−1 flushes all of the dirty cache 112 lines written before a specified time t. Each node 106 may maintain a counter "CC" on the number of written cache 112 lines. After time t, node i−1 initializes another counter "C" that is used to indicate how many dirty cache 112 lines have been flushed to disk 108. If a new write is a cache 112 miss, the block addresses of the written data are inserted into a hash table. The new writes have a new phase number and are replicated to node i+1.

If the new write is a cache 112 hit and there is no hash table entry corresponding to the write, the written block addresses are inserted into the hash table. The cache 112 lines that correspond to the write are replicated to node i+1 as well. Meanwhile, node i−1 may invalidate the old cache 112 entry that corresponds to the dirty cache 112 lines in the global cache 112 directory and inserts a new entry for the updated cache 112 entry with a new phase number. The old cache 112 line has the old phase number. Node i−1 also decrements CC by the number of cache 112 lines written.

When the cache 112 lines are flushed to disk 108, node i−1 checks to see if the flushed data cache 112 lines are in the hash table. If not, i−1 increments C, since these cache 112 lines must be written before t. Otherwise, the block addresses should have been found in the hash table. If the cache 112 lines are found in the hash table, C is not incremented. After the cache 112 line is flushed to disk 108, the cache 112 line address is inserted into the hash table so that the subsequent writes to the same block address can be treated as a new write (the counter C won't be incremented again later on).

When C is equal to CC, node i knows that all the dirty blocks have been written to disk 108. Accordingly, there may be no need to maintain the hash table any more. Thus, node i may remove the hash table. The entire node 106 removal algorithm works as follows:

(1) Node i sends a "node removal" command to node i−1. Meanwhile, node i stops accepting new requests.

(2) Node i−1 marks node i+1 as its partner 202 once it receives the notice from node i. Meanwhile, node i−1 may also send the global cache 112 directory a message to indicate that node i−1's partner 202 is node i+1.

(3) Node i−1 and node i both flush dirty pages to disk 108. Whenever an old dirty cache 112 line is flushed to disk 108, node i−1 or node i also send invalidation messages to the global cache 112 directory to indicate that the dirty data has been flushed to disk 108. The corresponding cache 112 entries can be removed from the global cache 112 directory. Note that the old dirty cache 112 entries on node i−1 may have duplicates on node i, such that both node i and node i−1 have the same old phase number. When node i−1 or node i send invalidation messages to the global cache 112 directory, the global cache 112 directory manager may invalidate appropriate cache 112 entries. When all the dirty cache 112 lines are flushed to disk 108, the global cache 112 directory should only contain the data with the new phase numbers for node i−1.

(4) After node i−1 completes flushing the data to disk 108, node i−1 may send an "I'm done" message to node i.

(5) Once node i finishes flushing and receives the "I'm done" message from node i−1, node i can be removed. Thereafter, the next time that node i+1 is removed, the new phase number can be the negate of the old phase number.

Removing a Failed Cluster 114 Node 106

Removing a working node 106 from the cluster 114 is somewhat different from removing a failed node 106. In one or more embodiments of the invention, the partner node 202 periodically monitors the owner node's 204 liveness. When node i fails, node i+1 will find out (or be informed) of the node 106 failure. Once the failure is detected, node i+1 attempts to re-establish the fail-over chain between node i−1 and node i+1 quickly.

Accordingly, node i+1 may first notify node i−1 about node i's failure. Thereafter, node i+1 can either use the flushing or mirror forwarding methods (as described above) to protect node i's written data. Node i−1 can also use the flushing or mirror forwarding methods as well. After the dirty cache 112 lines are either flushed to disk 108 or forwarded to appropriate nodes 106, node i−1 and i+1 may both inform the global cache 112 directory to update its cache 112 directory contents.

Adding a New Node 106

Adding a new node 106 to the cluster 114 is the reverse of removing a node 106. That is, when a node "a" is added between node i and node i+1, node i needs to establish mirroring to node "a", and node "a" should establish mirroring to node i+1. One simple approach is to let node "a" first notify node i, so that node i can flush its written cache 112 lines to disk 108. In such an embodiment, the mirrored cache 112 copy in node i+1 may not be needed.

Subsequently, node i notifies the global cache 112 directory manager to update its cache 112 directory content. The cache 112 directory manager updates its content by establishing an owner-partner relationship between node i and node "a", and node "a" and node i+1. After node i sends the notice to the global cache 112 directory manager, all of the writes may be queued until node i receives an acknowledgment from the cache 112 directory manager. Once notified, the new writes to i may be mirrored to node "a". Subsequently, new writes to node "a" may be mirrored to node i+1.

Conclusion

This concludes the description of one or more embodiments of the invention. In summary, the invention describes a method, apparatus, article of manufacture, and a memory structure for improving write performance in a cluster-based file system 100.

One or more embodiments of the invention provide a mirrored-cache approach that improves write performance without sacrificing read performance. Further, the recovery process is efficient and may simply examine the mirrored cache 112 to find the most up-to-date data copies.

In accordance with one or more embodiments of the invention, a cluster 114 of nodes 106 are chained together so that each pair of nodes 106 have an owner-partner relationship. Write performance may be improved by letting writes return as long as data is written to the data owner's 204 file cache 112 and its partner's 202 mirrored file cache 112. A dynamically adjusted write file cache 112 counter may be used to avoid read cache 112 pollution, thereby ensuring fast accesses for both reads and writes. Various approaches may be utilized to allow on-line addition/deletion of cluster 114 nodes 106. For example, one approach is based on the goal of minimizing the performance fluctuation. Another approach may provide a simplified implementation. Additionally, various approaches may be based on flushing dirty cache 112 lines, mirrored cache 112 forwarding, and/or the combination of both for removing a node 106 on-line. Also, an alternative for node 106 removal is provided by using additional local cache 112 directory and global cache 112 directory information to establish an owner-partner relationship between two nodes (e.g., node i−1 and i+1).

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of writing to cache in a clustered environment comprising
   (a) receiving a request to write data in a first node of a storage cluster from a user application;
   (b) determining if the data is owned by a remote node;
   (c) if the data is owned by the remote node; causing an invalidation of the data in the remote node if necessary;
   (d) writing the data in a cache of the first node;
   (e) causing the data to be written in a cache of a partner node of the first node, wherein the partner node maintains, in the partner node's cache, a secondary data copy of the first node's cached data;
   (f) receiving, in the first node, a response from the partner node; and
   (g) removing the first node from the storage duster by;
      (i) ensuring that data in the cache of the first node is safely stored;
      (ii) establishing an owner-partner relationship between die partner node and a second node for which the first node was a partner; and
      (iii) removing the first node.

2. The method of claim 1 wherein the determining utilizes a global cache directory that maintains information on which node contains a most up-to-date copy of data.

3. The method of claim 2 wherein an invalidation of the remote node is not necessary.

4. The method of claim 1 further comprising notifying the user application of a completion of a write operation.

5. The method of claim 1 further comprising utilizing a dynamically adjusted upper bound to determine the amount of space available to store data in the partner node.

6. The method of claim 5 further comprising:
   the first node observing a read-intensive workload; and
   decreasing the upper bound.

7. The method of claim 5 further comprising:
   the first node observing a write-intensive workload; and
   increasing the upper bound.

8. The method of claim 5 further comprising:
   determining if the upper bound has been reached;
   waiting until data has been flushed to disk prior to writing to the cache of the partner node.

9. The method of claim 1 further comprising:
   determining if the first node crashes; and
   recovering data using the data stored in the cache of the partner node.

10. The method of claim 1 further comprising:
    writing data in the cache of the first node to disk;
    causing any new write requests to the first node to be synchronously written to disk;
    causing the second node to write data in a cache of the second node to disk;
    causing the partner node to remove mirrored cache entries for the first node when the writing of the data in the cache of the first node to disk is complete; and
    removing the first node.

11. The method of claim 1 further comprising a global cache directory manager ensuring that directory information is consistent with information stored in the cache of the partner node and a cache of the second node, said ensuring comprising:
    removing directory entries for mirrored cache in the partner node that are owned by the first node so that subsequent requests can find data from disk, wherein the first node continues to accept invalidation messages until the global cache directory manager ensures consistent directory states;
    removing mirrored cache entries in the partner node that are owned by the first node;
    removing directory entries that are owned by the first node; and
    informing the first node that it way be removed.

12. The method of claim 1 further comprising:
    the first node notifying the partner node of the removal of the first node;
    causing the partner node to read mirrored cache data in the first node;
    causing the partner node to write the mirrored cache data to the cache of the partner node, wherein the write causes a replication of the data to a cache of a third node; and
    removing the first node.

13. The method of claim 1 further comprising:
    storing additional information on who a node's partner is in a phase number; and
    determining a node's partner based on an indirect lookup table and the phase number.

14. The method of claim 1 further comprising:
receiving a node removal command in the second node;
identifying the partner node as a partner of the second node;
flushing dirty cache from the second node to disk;
flushing dirty cache from the first node to disk;
invalidating entries in a global cache directory based on the flushing;
removing cache entries corresponding to the flashed cache lines from the global cache directory;
notifying the first node when the flushing has been completed in the second node; and
removing the first node.

15. The method of claim 14 wherein block addresses of written data are inserted into a hash table that is used to identify data that has been written to disk.

16. The method of claim 1 further comprising causing the data to be asynchronously written to disk.

17. An apparatus for writing cache in a clustered environment comprising:
(a) a cache;
(b) a first storage node and a partner storage node organized in a storage duster, each storage node having an interface for connecting to a host and a storage disk, wherein each storage node maintains cache, wherein the partner storage node maintains, in the partner storage node's cache, a secondary data copy of the first storage node's cached data and wherein at least one of the storage nodes is configured to:
(i) receive a request to write data from a user application;
(ii) determine if the data is owned by a remote node;
(iii) if the data is owned by the remote node, cause an invalidation of the data in the remote node if necessary;
(iv) write the data in a cache of the first node;
(v) cause the data to be written in a cache of a partner node of the first node; and
(vi) receive, in the first node, a response from the partner node;
(vii) remove the first node from the storage cluster by:
(1) ensuring that data in the cache of the first node is safely stored;
(2) establishing an owner-partner relationship between the partner node and a second node for which the first node was a partner; and
3) removing the first node.

18. The apparatus of claim 17 further comprising a global cache directory that maintains information on which node contains a most up-to-date copy of data.

19. The apparatus of claim 18 wherein an invalidation of the remote node is not necessary.

20. The apparatus of claim 17 wherein at least one of the nodes is further configured to notify the user application of a completion of a write operation.

21. The apparatus of claim 17 wherein at least one of the nodes is further configured to utilize a dynamically adjusted upper bound to determine the amount of space available to store data in the partner node.

22. The apparatus of claim 21 wherein at least one of the nodes is further configured to:
observe a read-intensive workload; and
decrease the upper bound.

23. The apparatus of claim 21 wherein at least one of the nodes is further configured to:
observe a write-intensive workload; and
increase the upper bound.

24. The apparatus of claim 21 wherein at least one of the nodes is further configured to:
determine if the upper bound has been reached;
wait until data has been flushed to disk prior to writing to the cache of the partner node.

25. The apparatus of claim 17 wherein at least one of the nodes is further configured to:
determine if the first node crashes; and
recover data using the data stored in the cache of the partner node.

26. The apparatus of claim 17 wherein at least one of the nodes is further configured to:
write data in the cache of the first node to disk;
cause any new write requests to the first node to be synchronously written to disk;
cause the second node to write data in a cache of the second node to disk;
cause the partner node to remove mirrored cache entries for the first node when the writing of the data in the cache of the first node to disk is complete; and
remove the first node.

27. The apparatus of claim 17 further comprising a global cache directory manager configured to ensure that directory information is consistent with information stored in the cache of the partner node and a cache of the second node1 said manager configured to ensure by:
removing directory entries for mirrored cache in the partner node that are owned by the first node so that subsequent requests can find data from disk, wherein the first node continues to accept invalidation messages until the global cache directory manager ensures consistent directory states;
removing mirrored cache entries in the partner node that axe owned by the first node;
removing directory entries that are owned by the first node; and
informing the first node that it may be removed.

28. The apparatus of claim 17 wherein at least one of the nodes is configured to:
notify the partner node of the removal of the first node;
cause the partner node to read mirrored cache data in the first node;
cause the partner node to write the mirrored cache data to the cache of the partner node, wherein the write causes a replication of the data to a cache of a third node; and
remove the first node.

29. The apparatus of claim 17 wherein at least one of the nodes is further configured to:
store additional information on who a node's partner is in a phase number; and
determine a node's partner based on an indirect looking table and the phase number.

30. The apparatus of claim 17 wherein at least one of the nodes is further configured to:
receive a node removal command in the second node;
identify the partner node as a partner of the second node;
flush dirty cache from the second node to disk;
flush dirty cache from the first node to disk;

invalidate entries in a global cache directory based on the flushing;

remove cache entries corresponding to the flushed cache lines from the global cache directory;

notify the first node when the flushing has been completed in the second node; and remove the first node.

31. The apparatus of claim 30 wherein at least one of the nodes is further configured to insert block addresses of written data into a hash table that is used to identify data that has been written to disk.

32. The apparatus of claim 17 wherein at least one of the nodes is further configured to cause the data to be asynchronously written to disk.

33. An article of manufacture, embodying logic to perform a method of writing cache in a clustered environment, the method comprising:

(a) receiving a request to write data in a first node of a storage cluster from a user application;

(b) determining if the data is owned by a remote node;

(c) if the data is owned by the remote node, causing an invalidation of the data in the remote node if necessary;

(c) writing the data in a cache of the first node;

(e) causing the data to be written in a cache of a partner node of the first node, wherein the partner node maintains, in the partner node's cache, a secondary data copy of the first node's cached data; and (f) receiving, in the first node, a response from the partner node; and (g) removing the first node from the storage cluster by:
  (i) ensuring that data in the cache of the first node is safely stored;
  (ii) establishing an owner-partner relationship between the partner node and a second node for which the first node was a partner; and
  (iii) removing the first node.

34. The article of manufacture of claim 33 wherein the determining utilizes a global cache directory that maintains information on which node contains a most up-to-date copy of data.

35. The article of manufacture of claim 34 wherein an invalidation of the remote node is not necessary.

36. The article of manufacture of claim 33, the method further comprising notifying the user application of a completion of a write operation.

37. The article of manufacture of claim 33, the method further comprising utilizing a dynamically adjusted upper bound to determine the amount of space available to store data in the partner node.

38. The article of manufacture of claim 37, the method further comprising:

the first node observing a read-intensive workload; and decreasing the upper bound.

39. The article of manufacture of claim 37, the method further comprising:

the first node observing a write-intensive workload; and increasing the upper bound.

40. The article of manufacture of claim 37, the method further comprising:

determining if the upper bound has been reached;

waiting until data has been flushed to disk prior to writing to the cache of the partner node.

41. The article of manufacture of claim 33, the method further comprising:

determining if the first node crashes; and recovering data using the data stored in the cache of the partner node.

42. The article of manufacture of claim 33, the method further comprising:

writing data in the cache of the first node to disk;

causing any new write requests to the first node to be synchronously written to disk;

causing the second node to write data in a cache of the second node to disk;

causing the partner node to remove mirrored cache entries for the first node when the writing of the data in the cache of the first node to disk is complete; and removing the first node.

43. The article of manufacture of claim 33, the method further comprising a global cache directory manager ensuring that directory information is consistent with information stored in the cache of the partner node and a cache of the second node, said ensuring comprising:

removing directory entries for mirrored cache in the partner node that are owned by the first node so that subsequent requests can find data from disk, wherein the first node continues to accept invalidation messages until the global cache directory manager ensures consistent directory states;

removing mirrored cache entries in the partner node that are owned by the first node;

removing directory entries that are owned by the first node; and informing the first node that it may be removed.

44. The article of manufacture of claim 33, the method further comprising:

the first node notifying the partner node of the removal of the first node;

causing the partner node to read mirrored cache data in the first node;

causing the partner node to write the mirrored cache data to the cache of the partner node, wherein the write causes a replication of the data to a cache of a third node; and removing the first node.

45. The article of manufacture of claim 33, the method further comprising:

storing additional information on who a node's partner is in a phase number; and determining a node's partner based on an indirect lookup table and the phase number.

46. The article of manufacture of claim 33, the method further comprising:

receiving a node removal command in the second node;

identifying the partner node as a partner of the second node;

flushing dirty cache from the second node to disk;

flushing dirty cache from the first node to disk;

invalidating entries in a global cache directory based on the flushing;

removing cache entries corresponding to the flushed cache lines from the global cache directory;

notifying the first node when the flushing has been completed in the second node; and removing the first node.

47. The article of manufacture of claim 46 wherein block addresses of written data arc inserted into a hash table that is used to identify data that has been written to disk.

48. The article of manufacture of claim 33, the method further comprising causing the data to be asynchronously written to disk.

* * * * *